(12) United States Patent
Thornton et al.

(10) Patent No.: US 8,359,361 B2
(45) Date of Patent: Jan. 22, 2013

(54) TECHNIQUES TO SHARE MEDIA FILES THROUGH MESSAGING

(75) Inventors: John Thornton, Redmond, WA (US); Ojiakonobi Udezue, Redmond, WA (US); Rodger Benson, Seattle, WA (US); Jennifer Shen, Mountain View, CA (US); Dave Citron, Redmond, WA (US); Tatjana Fournier, Snoqualmie, WA (US); Bradley Weed, Redmond, WA (US); Wilhelmina Dietrich, Seattle, WA (US); Becky Pezely, Seattle, WA (US); Jason Moore, Redmond, WA (US); Alan Urdan, Seattle, WA (US); Robin Counts, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 12/775,239

(22) Filed: May 6, 2010

(65) Prior Publication Data

US 2011/0276637 A1    Nov. 10, 2011

(51) Int. Cl.
 *G06F 15/16* (2006.01)
(52) U.S. Cl. ........ 709/206; 709/204; 709/217; 709/218; 709/219; 707/821; 707/827
(58) Field of Classification Search .................. 709/206, 709/204, 217–219; 707/821, 827
See application file for complete search history.

(56) References Cited

U.S. PATENT DOCUMENTS

| | | | |
|---|---|---|---|
| 5,781,901 A * | 7/1998 | Kuzma | 1/1 |
| 7,028,075 B2 * | 4/2006 | Morris | 709/206 |
| 7,054,905 B1 * | 5/2006 | Hanna et al. | 709/206 |
| 7,734,700 B2 * | 6/2010 | Johns et al. | 709/206 |
| 7,886,010 B1 * | 2/2011 | Shankar | 709/206 |
| 7,966,565 B2 * | 6/2011 | Dawson et al. | 715/751 |
| 2002/0147840 A1 * | 10/2002 | Mutton et al. | 709/239 |
| 2003/0046349 A1 * | 3/2003 | Burgin et al. | 709/206 |
| 2003/0084106 A1 * | 5/2003 | Erev et al. | 709/206 |
| 2003/0097410 A1 * | 5/2003 | Atkins et al. | 709/206 |
| 2003/0200268 A1 * | 10/2003 | Morris | 709/206 |
| 2003/0234953 A1 * | 12/2003 | Dawson et al. | 358/1.15 |
| 2004/0158607 A1 * | 8/2004 | Coppinger et al. | 709/206 |
| 2004/0172451 A1 * | 9/2004 | Biggs et al. | 709/206 |
| 2004/0230663 A1 * | 11/2004 | Ackerman | 709/207 |
| 2004/0243676 A1 * | 12/2004 | Blankenship | 709/206 |
| 2005/0144284 A1 * | 6/2005 | Ludwig et al. | 709/226 |
| 2005/0188026 A1 * | 8/2005 | Hilbert et al. | 709/206 |
| 2005/0192966 A1 * | 9/2005 | Hilbert et al. | 707/10 |
| 2005/0223073 A1 * | 10/2005 | Malik | 709/206 |
| 2006/0031309 A1 * | 2/2006 | Luoffo et al. | 709/206 |
| 2006/0265458 A1 * | 11/2006 | Aldrich et al. | 709/206 |
| 2007/0067726 A1 | 3/2007 | Flynt | |
| 2007/0244977 A1 * | 10/2007 | Atkins | 709/206 |

(Continued)

OTHER PUBLICATIONS

"Lots and Lots of Storage", http://windowslivewire.spaces.live.com/blog/cns!2F7EB29B42641D59!46568.entry, published Jan. 11, 2010, 1 page.

(Continued)

*Primary Examiner* — Alina N. Boutah

(57) ABSTRACT

Techniques to share media files through messaging are described. An apparatus may comprise a processor and a memory communicatively coupled to the processor. The memory may store a message application that when executed by the processor is operative to communicate a message and a message attachment comprising a media file at different time intervals using different transports. The message may have a link comprising a reference to a discoverable storage location for the media file. Other embodiments are described and claimed.

19 Claims, 9 Drawing Sheets

U.S. PATENT DOCUMENTS

| | | | | |
|---|---|---|---|---|
| 2007/0271340 A1* | 11/2007 | Goodman et al. | | 709/206 |
| 2007/0271344 A1* | 11/2007 | Danasekaran et al. | | 709/206 |
| 2008/0034063 A1* | 2/2008 | Yee | | 709/219 |
| 2008/0114844 A1* | 5/2008 | Sanchez et al. | | 709/206 |
| 2008/0172663 A1* | 7/2008 | Lee | | 717/173 |
| 2008/0189379 A1* | 8/2008 | Naick et al. | | 709/206 |
| 2008/0209329 A1* | 8/2008 | DeFranco et al. | | 715/733 |
| 2008/0313287 A1* | 12/2008 | Wadsworth et al. | | 709/206 |
| 2008/0320094 A1* | 12/2008 | Tu et al. | | 709/206 |
| 2009/0049147 A1* | 2/2009 | Kato et al. | | 709/206 |
| 2009/0063648 A1* | 3/2009 | Malik et al. | | 709/206 |
| 2009/0198779 A1* | 8/2009 | Agrawal et al. | | 709/206 |
| 2009/0276501 A1* | 11/2009 | Saito | | 709/206 |
| 2009/0300139 A1* | 12/2009 | Shoemaker et al. | | 709/217 |
| 2009/0307370 A1* | 12/2009 | Boerries et al. | | 709/232 |
| 2009/0319620 A1* | 12/2009 | Gross et al. | | 709/206 |
| 2010/0017491 A1* | 1/2010 | Johns et al. | | 709/206 |
| 2010/0063961 A1* | 3/2010 | Guiheneuf et al. | | 707/622 |
| 2010/0082713 A1* | 4/2010 | Frid-Nielsen et al. | | 707/821 |
| 2010/0169411 A1* | 7/2010 | Colton et al. | | 709/203 |
| 2010/0174799 A1* | 7/2010 | Hewitt et al. | | 709/206 |
| 2010/0313250 A1* | 12/2010 | Chow | | 726/5 |
| 2011/0078264 A1* | 3/2011 | Halahmi et al. | | 709/206 |
| 2011/0106899 A1* | 5/2011 | Madnani | | 709/206 |
| 2011/0113109 A1* | 5/2011 | LeVasseur et al. | | 709/206 |
| 2011/0113317 A1* | 5/2011 | Ramaswamy | | 715/205 |
| 2011/0119293 A1* | 5/2011 | Taylor et al. | | 707/769 |
| 2011/0138004 A1* | 6/2011 | McConn et al. | | 709/206 |
| 2011/0173214 A1* | 7/2011 | Karim | | 707/754 |

OTHER PUBLICATIONS

Frohlich, David et al., "Requirements for Photoware", Hewlett Packard Laboratories, Nov. 16-20, 2002, 10 pages.

Van House, Nancy A. et al., "The Social Uses of Personal Photography: Methods for Projecting Future Imaging Applications", Sep. 2004, 12 pages.

Perez, Juan Carolos, "Yahoo Sends PhotoMail: New service will ease the process of sharing digital photos via e-mail", http://www.pcworld.com/article/121005/yahoo_sends_photomail.html, May 26, 2005, 4 pages.

* cited by examiner

TECHNIQUES TO SHARE MEDIA FILES THROUGH MESSAGING

BACKGROUND

Message applications are designed to communicate messages between multiple devices. One of the many advantages of message applications is the capability to communicate files as message attachments. For instance, media files such as images, photographs and videos on one computing device may be attached to a message and transported to other computing devices. However, media files are relatively large and therefore consume significant amounts of processing and communications resources. As such, message applications typically limit a file size for attachments, particularly when communication bandwidth is constrained, such as for wireless devices. Such limitations inhibit users from sharing media files via message applications. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to share media files through message applications. Some embodiments are particularly directed to techniques to share media files attached to a message by publishing the media files to a network storage server discoverable by a message sender or a message recipient prior to communicating the actual message. Further, the message and the media files may be communicated using different transports specifically designed to efficiently communicate the respective content.

In one embodiment, for example, an apparatus may comprise a computing device having a processor and a memory communicatively coupled to the processor. The memory may store a message application that when executed by the processor is operative to communicate a message and a message attachment comprising a media file at different time intervals using different transports. The message may have a link comprising a reference to a discoverable storage location for the media file. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to techniques for enhanced messaging services and media file sharing techniques to effectively and efficiently allow electronic systems and devices to communicate and share messages and message attachments using different message applications or modalities. In various embodiments, a message application is arranged to communicate a message and a message attachment comprising one or more media files at different time intervals using different transports. In one embodiment, for example, the message application sends the media files to a message server using a separate transport before sending the actual message. The message application receives a link to the media files from the message server. The link is a reference or pointer to the media file as stored at a discoverable storage location, such as a hyperlink or hypertext. The message application embeds the link in the message, and sends the message to the message server over a different transport from the one used for the media file. Additionally or alternatively, the same transport may be used for the media files and the message at different time intervals. Additionally or alternatively, alternate versions of the media files may also be embedded within the message in accordance with varying formats and operational settings, such as privacy parameters. Other embodiments are described and claimed.

The enhanced messaging services and media file sharing techniques provide several advantages over conventional techniques. For example, the use of separate transports at different time intervals conserves processing and communications resources while offering a similar user interface and user experience in sending regular messages with attachments. Further, an enhanced user interface specifically designed to manage attachments provides a more robust and rich user experience for receiving media file attachments. In addition, output from a message application on a client is technically compatible with network storage techniques. As another example, media files are stored in a discoverable manner for easier access by a message sender and/or message recipient, rather than randomly storing media files in hidden and protected locations in a server array. As a result of these and other advantages, the embodiments can improve affordability, scalability, modularity, extendibility, or interoperability for an operator, device or network.

Figure 1:
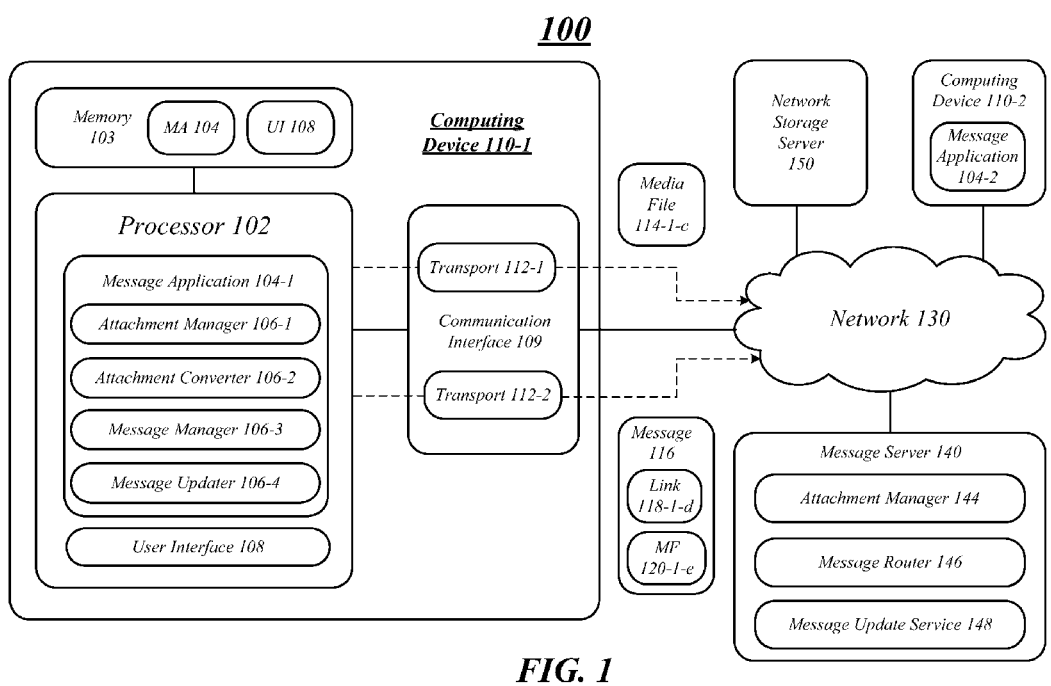
FIG. 1 illustrates an embodiment of a messaging architecture.

FIG. 1 illustrates a block diagram for a messaging architecture 100 suitable for implementing one or more enhanced messaging services and media file sharing techniques to effectively and efficiently allow electronic systems and devices to communicate and share messages and message attachments using different message applications or modalities.

In various embodiments, the messaging architecture 100 may comprise a computer-implemented messaging architecture 100 having multiple types of systems and devices composed of multiple hardware and software components. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the messaging architecture 100 may be implemented as a distributed system that distributes portions of the structure and/or operations for the media sharing techniques across multiple computing entities. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In the illustrated embodiment shown in FIG. 1, all or some of the messaging architecture 100 may be implemented as part of one or more electronic devices having both computing and communications capabilities. The communications capabilities may include both wired and wireless communications capabilities. Examples of an electronic device may include without limitation a computing device, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The various systems and devices shown as part of the messaging architecture 100 may be communicatively coupled via various types of communications media, such as a wired and/or wireless network. Similarly, components for a given system or device may coordinate operations between each other. The coordination may involve the uni-directional or bi-directional exchange of information. For instance, certain components may communicate information in the form of signals communicated over a communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces. Specific communication techniques suitable for certain embodiments may be described with reference to FIG. 10.

In the illustrated embodiment shown in FIG. 1, the messaging architecture 100 may comprise multiple computing devices 110-1-a, a message server 140 and a network storage server 150 all communicating over a network 130. The computing devices 110-1-a may each implement one or more message applications 104-1-b. The message server 140 may implement message components such as a message router 144, an attachment manager 146 and a message updater 148, among other message components. Although the messaging architecture 100 as shown in FIG. 1 has a limited number of elements in a certain topology, it may be appreciated that the messaging architecture 100 may include more or less elements in alternate topologies as desired for a given implementation.

The network 130 may comprise a communications framework designed to communicate information between the various devices of the messaging architecture 100. The network 130 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators).

The message server 140 may comprise or employ one or more server computing devices and/or server programs that operate to perform various methodologies in accordance with the described embodiments. For example, when installed and/or deployed, a server program may support one or more server roles of the server computing device for providing certain services and features. Exemplary message server 140 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

The network storage server 150 may also comprise or employ one or more server computing devices and/or server programs that operate to perform various methodologies in accordance with the described embodiments. For example, when installed and/or deployed, a server program may support one or more server roles of the server computing device for providing certain services and features. Exemplary network storage server 150 may include, for example, stand-alone and enterprise-class server computers operating a server OS such as a MICROSOFT OS, a UNIX OS, a LINUX OS, or other suitable server-based OS. Exemplary server programs may include, for example, network storage server programs such as MICROSOFT® LIVE providing online network storage of documents and files, including multimedia or media files such as images, photographs, photo albums, videos, video albums, and so forth. Exemplary server programs may further include, for example, network application programs such as social networking application programs, search applications, document management programs, weblogs (blogs), word processing programs, spreadsheet programs, database programs, drawing programs, document sharing programs, message applications, web services, web applications, web server, and/or other types of programs, applications, or services in accordance with the described embodiments.

The computing devices 110-1-a may each comprise a processor 102 and a memory 103 communicatively coupled to the processor 102. The processor 102 and the memory 103 may each be communicatively coupled to a communication interface 109. An exemplary architecture and examples for computing devices 110-1-a may be described with reference to FIG. 9.

The communications interface 109 may comprise or implement various communication techniques to allow the computing devices 110-1-a to communicate with each other and the other devices of the messaging architecture 100 via the network 130. For instance, the various devices of the messaging architecture 100 may each include a communication interface 109 that implements various types of standard communication elements designed to be interoperable with the network 130, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the communications interface 109 may comprise multiple different types of transports 112-1-p. Each of the transports 112-1-p may implement or utilize a same or different set of communication parameters to communicate information between the various devices of the messaging architecture 100. In one embodiment, for example, each of the transports 112-1-p may implement or utilize a different set of communication parameters to communicate information between the computing devices 110-1-a and the message server 140. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the communications interface 109 implemented by the computing devices 110-1-a. The embodiments are not limited in this context.

In various embodiments, the communications interface 109 of the computing device 110-1 may implement different communication parameters offering varying bandwidths or communications speeds. For instance, the transport 112-1 may comprise a high-speed interface implementing suitable communication parameters for high-speed communications of information to the message server 140, while the transport 112-2 may comprise a low-speed interface implementing suitable communication parameters for lower-speed communications of information to the message server 140.

With respect to wired communications, for example, the transport 112-1 may comprise a network interface designed to communicate information over a packet-switched network such as the Internet. The transport 112-1 may be arranged to provide data communications functionally in accordance with different types of wired network systems or protocols. Examples of suitable wired network systems offering data communication services may include the Internet Engineering Task Force (IETF) Transmission Control Protocol (TCP) and the Internet Protocol (IP) suite of communications standards, the User Datagram Protocol (UDP), the Datagram Congestion Control Protocol (DCCP), the Stream Control Transmission Protocol (SCTP), the Resource Reservation Protocol (RSVP), the Explicit Congestion Notification (ECN) protocol, the Open Shortest Path First (OSPF) suite of protocols, Reliable Transport Protocol (RTP), the IETF Real-Time Transport Protocol (RTP), and so forth. The transport 112-2 may be arranged to provide data communications in accordance with different message protocols, such as the Simple Mail Transfer Protocol (SMTP), extended SMTP (ESMTP), Post Office Protocol (POP), POP3, the Internet Message Access Protocol (IMAP), Multipurpose Internet Mail Extensions (MIME) protocol, Unix-to-Unix Copy (UUCP) protocol, the International Telecommunication Union (ITU) suite of protocols such as the ITU-T X.400 protocol, and so forth. It may be appreciated that other wired communications techniques may be implemented, and the embodiments are not limited in this context.

With respect to wireless communications, for example, the transport 112-1 may comprise a radio designed to communicate information over a wireless local area network (WLAN). The transport 112-1 may be arranged to provide data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The transport 112-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. It may be appreciated that other wireless techniques may be implemented, and the embodiments are not limited in this context.

In various embodiments, the communications interface 109 of the computing device 110-1 may implement a same set of communication parameters offering identical or substantially similar bandwidths or communications speeds. However, the transports 112-1, 112-2 may be utilized by the message application 104-1 at different points in time. In one embodiment, for instance, the message application 104-1 may communicate the one or more media files 114-1-c during a first time interval, and a message 116 with information pertaining to the one or more media files 114-1-c during a second time interval. In one embodiment, for example, the first and second time intervals may be completely discontinuous, where a start time and an end time for the first time interval are before a start time for the second time interval. In one embodiment, for example, the first and second time intervals may be partially overlapping, where a start time for the first time interval is before a start time for the second time interval but the end time for the first time interval is after the start time for the second time interval. The embodiments are not limited in this context.

The computing devices 110-1-*a* may each implement one or more message applications 104-1-*b* arranged to communicate various types of messages in a variety of formats. Each of the message applications 104-1-*b* may be representative of a particular kind of transport, enabling handling of messages of particular types and formats for the particular application. The message applications 104-1-*b* may comprise without limitation a facsimile application, a video message application, an instant messaging (IM) application, a chat application, an electronic mail (email) application, a short message service (SMS) application, a multimedia message service (MMS) application, a social network system (SNS) application, and so forth. It is to be understood that the embodiments are not limited in this regard and that the message applications 104-1-*b* may include any other type of messaging or communications application which is consistent with the described embodiments. It also is to be appreciated that the computing devices 110-1-*a* may each implement other types of applications in addition to message applications 104-1-*b* which are consistent with the described embodiments.

As shown in FIG. 1, for example, the computing devices 110-1, 110-2 implement respective message applications 104-1, 104-2. The message applications 104-1, 104-2 may generally operate to generate, send, receive, update, modify and otherwise manage messages for the computing devices 110-1, 110-2. It may be appreciated that the implementation details shown for the computing device 110-1 and its message application 104-1 as described herein also applies to the computing device 110-2 and its respective message application 104-2.

In one embodiment, the message applications 104-1, 104-2 are implemented as stand-alone client-based applications stored and executed by local resources provided by the computing devices 110-1, 110-2, such as the processor 102 and the memory 103 of the computing device 110-1, rather than network based message applications implemented on network devices and accessed by the computing devices 110-1, 110-2 via a web browser. In one embodiment, the message applications 104-1, 104-2 may comprise distributed applications suitable for distributed processing and partially executing on local resources for the computing devices 110-1, 110-2 and partially executing on network resources. Additionally or alternatively, the message applications 104-1, 104-2 may comprise network based message applications implemented on network devices and accessed by the computing devices 110-1, 110-2 via a web browser. The embodiments are not limited in this context.

The message application 104-1 implements various techniques to communicate a message and a message attachment comprising a media file at different time intervals using different transports. To accomplish this, the message application 104-1 comprises various client message components 106-1-*c*, including an attachment manager 106-1, an attachment converter 106-2, a message manager 106-3, and a message updater 106-4. Although the message application 104-1 as shown in FIG. 1 has a limited number of elements in a certain topology, it may be appreciated that the message application 104-1 may include more or less elements in alternate topologies as desired for a given implementation.

In various embodiments, the message application 104-1 comprises the attachment manager 106-1. The attachment manager 106-1 may be generally arranged to manage attachments for the message application 104-1. The attachment manager 106-1 may detect that a particular set of attachments are to be added to a message 116, and may select a particular transport 112-1-*p* suitable for the given set of attachments. For instance, the attachment manager 106-1 may evaluate a size parameter associated with some or all of the proposed attachments, and select a transport 112-1-*p* based on the size parameter. A single attachment having a smaller file size may use a slower transport, while multiple attachments having a larger collective file size may use a faster transport, for example. A particular transport 112-1-*p* may be matched to a given set of attachments based on any number of computing or communication parameters, including bandwidth, cost, latency, processing resources, memory resources, power state, power availability, network availability, user selection, and so forth. The embodiments are not limited in this context.

In one embodiment, for example, the attachment manager 106-1 may be arranged to receive a request to attach a media file 114-1-*c* to a message 116, send the media file 114-1-*c* to a message server 140 over a transport 112-1, receive a link 118-1-*d* for the media file 114-1-*c* from the message server 140 over the transport 112-1, and embed the link 118-1-*d* in the message 116 for communication to a message recipient (e.g., the computing device 110-2).

The media file 114-1-*c* may comprise any type of multimedia file of a given media file format suitable for attachment to a message. Examples for a media file 114-1-*c* include without limitation text, audio, still images, photographs, graphics, animation, video, movies, audio/video, interactive content, application files, hypermedia, gaming files, computer-aided design (CAD) files, database files, documents, map files, graphic information system files, program code, and any other types of media content consistent with the described embodiments. In one embodiment, for example, the media file 114-1-*c* may comprise an image such as a photograph. Some examples of media file formats for images may include without limitation the image extensions "JPG", "JPEG", "GIF", "PNG", "BMP", "TIFF", "TIF", "ICO", "DIB", and so forth. In one embodiment, for example, the media file 114-1-*c* may comprise a video such as a movie. Some examples of media file formats for video may include without limitation Windows Media Video (WMV), Moving Picture Experts Group (MPEG) Phases 1-4, QuickTime (MOV), and so forth. The embodiments are not limited to any given media type or media format for the media file 114-1-*c*.

In various embodiments, the message application 104-1 comprises the attachment converter 106-2. The attachment converter 106-2 may be generally arranged to convert media files 114-1-*c* from one format to another format. In one embodiment, the attachment converter 106-2 may be arranged to modify one or more attributes of the media file 114-1-*c* to form an alternate version of the media file 120-1-*e*. The media file 120-1-*e* may sometimes be referred to as a "thumbnail." For example, the attachment converter 106-2 may be arranged to modify a resolution attribute of the media file 114-1-*c* to form an alternate version of the media file 120-1-*e* having a lower resolution than the media file 114-1-*c*. Other attributes may be modified as well, such as size, cropping, position, rotation, color, black-and-white, metadata, tags and/or any other attributes consistent with the described embodiments.

In various embodiments, the message application 104-1 comprises the message manager 106-3. The message manager 106-3 may be generally arranged to manage messages communicated between a message sender and one or more message recipients. In one embodiment, for example, the message manager 106-3 may be arranged to communicate a message 116 over a transport 112-2. The message 116 may include one or more embedded links 118-1-*d* for one or more media files 114-1-*c* when communicated over the transport 112-2. The one or more embedded links 118-1-*d* may comprise a reference to the one or more media files 114-1-*c* as stored on the network storage server 150 and accessible by a message sender or a message recipient.

Each of the links **118-1-*d* may comprise a reference or pointer to stored media files 114-1-*c* that a user can directly follow, or that is followed automatically by a program. References are data types that refer to a referent (e.g., stored media files 114-1-*c* such as an object, file, data item, and so forth) elsewhere in memory of a device (e.g., a file server) and are used to access the referent. Generally, a reference is a value that enables a program to directly access the referent. The referent may be stored on a same device as the reference or a different device as the reference. Most programming languages support some form of reference. Examples for the links 118-1-*d* may include without limitation hypertext and hyperlinks, such as those used by the World Wide Web (WWW). Hypertext is text with hyperlinks. A hyperlink typically comprises an anchor, which is a location within a message from which the hyperlink can be followed. The target of a hyperlink is the stored media file 114-1-*c* to which the hyperlink leads. The user can follow the link when its anchor is shown by activating it in some way, such as by touching it (e.g., with a touch screen display) or clicking on it with a pointing device (e.g., a mouse). When a link 118-1-*d* is activated its target (e.g., the media file 114-1-*c***) is displayed, typically via a web browser.

In various embodiments, the message application 104-1 comprises the message updater 106-4. The message updater 106-4 may be generally arranged to dynamically update a stored version of the message 116. In one embodiment, for example, the message updater 106-4 may be arranged to dynamically update the message 116 with message updates having information for the message 116 received after the message has already been sent from the message application 104-1. Additionally or alternatively, the message updater 106-4 may be arranged to send message updates having information for the message 116 after the message has been sent to a message recipient and stored on a client device, such as the computing device 110-2, for example.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 2:
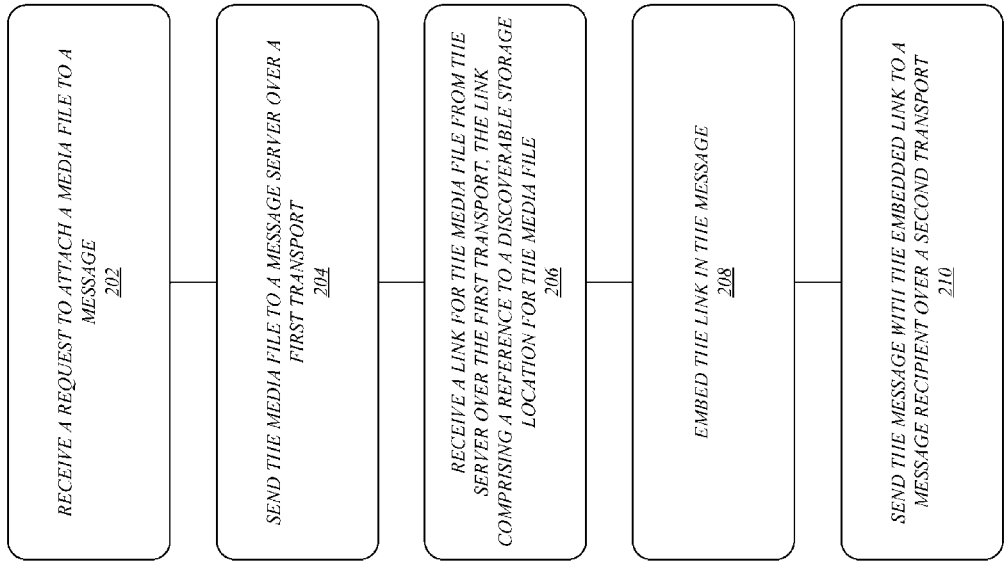
FIG. 2 illustrates an embodiment of a first logic flow.

FIG. 2 illustrates one embodiment of a logic flow 200. The logic flow 200 may be representative of some or all of the operations executed by one or more embodiments described herein. For instance, the logic flow 200 may be representative of some or all of the operations executed by the message applications 104-1, 104-2 implemented for the respective computing devices 110-1, 110-2.

In the illustrated embodiment shown in FIG. 2, the logic flow 200 may receive a request to attach a media file to a message at block 202. For example, assume a first user of the computing device 110-1 desires to communicate a message 116 with an attachment to a second user of the computing device 110-2. In generating a message 116, the attachment manager 106-1 of the message application 104-1 implemented by the computing device 110-1 may receive a request to attach one or more media files **114-1-*c* to a message 116. For instance, the one or more media files 114-1-*c* may comprise a set of photographs. The attachment manager 106-1 may implement a set of custom user interfaces and services to communicate the media files 114-1-*c*** in an efficient manner.

The logic flow 200 may send the media file to a message server over a first transport at block 204. For example, the attachment manager 106-1 may send the one or more media files **114-1-*c* to the message server 140 over the first transport 112-1 via the network 130**.

The logic flow 200 may receive a link for the media file from the server over the first transport, the link comprising a reference to a discoverable storage location for the media file at block 206. For example, the message server 140 may store the one or more media files **114-1-*c* on the network storage server 150, and return one or more links 118-1-*d* for the one or more media files 114-1-*c* to the computing device 110-1, using techniques described in more detail with reference to FIG. 3. In one embodiment, the one or more links 118-1-*d* for the one or more media files 114-1-*c* may comprise a reference to a discoverable storage location for one or more media files 114-1-*c* as stored on the network storage server 150. The discoverable storage location may be accessible by a message sender or a message recipient without the one or more links 118-1-*d***. For instance, the discoverable storage location may be a user account for a message sender or a message recipient and accessible via a web browser over the Internet. An example of a discoverable storage location might comprise without limitation a photo album having various levels of privacy settings controlling access to the photo album, with the privacy settings allowing access to the message sender and/or the message recipient.

The attachment manager 106-1 may receive the one or more links **118-1-*d* for the one or more media files 114-1-*c* from the message server 140 over the first transport 112-1. In one embodiment, the attachment manager 106-1 may modify the one or more received links 118-1-*d*, such as by combining multiple received links 118-1-*d* into a single link, combining the one or more links 118-1-*d* with other user interface elements of the message 116, converting the one or more links 118-1-*d* into a different user interface element for the message 116, combining the one or more links 118-1-*d* with one or more alternate versions of the media file 120-1-*e* of the one or more media files 114-1-*c* embedded in the message 116, and so forth. In this manner, different access points may be designed for retrieving the stored media files 114-1-*c*. For instance, selecting a media file 120-1-*e* embedded in the message 116 may activate the one or more links 118-1-*d* for a message recipient to view the corresponding media files 114-1-*c***. The embodiments are not limited in this context.

The logic flow 200 may embed the link in the message at block 208. For example, the attachment manager 106-1 may embed the one or more links **118-1-*d* in the message 116, along with additional information such as message content and/or alternative versions of the media files 114-1-*c***.

The logic flow 200 may send the message with the embedded link to a message recipient over a second transport at block 210. For example, the message application 104-1 may send the message 116 with the embedded links **118-1-*d* to one or more message recipients over a second transport 112-2. The message recipient may comprise, for example, the second user of the computing device 110-2**.

Figure 3:
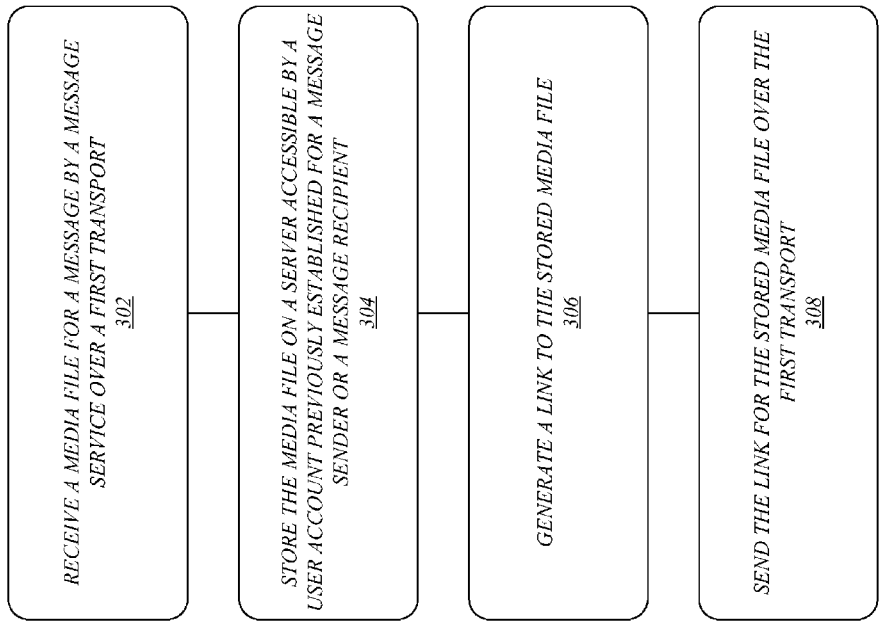
FIG. 3 illustrates an embodiment of a second logic flow.

FIG. 3 illustrates one embodiment of a logic flow 300. The logic flow 300 may be representative of some or all of the operations executed by one or more embodiments described herein. For instance, the logic flow 300 may be representative of some or all of the operations executed by the attachment manager 144, the message router 146 and/or the message update service 148 implemented for the message server 140.

The logic flow 300 may receive a media file for a message by a message service over a first transport at block 302. Continuing with our previous example discussed with reference to FIG. 2, for example, the attachment manager 144 of the message server 140 may receive the one or more media files 114-1-c for the message 116 communicated over the first transport 112-1 from the message application 104-1 of the computing device 110-1 to the message server 140.

The logic flow 300 may store the media file on a server accessible by a user account previously established for a message sender or a message recipient at block 304. For example, the attachment manager 144 of the message server 140 may interact with the network storage server 150 to store the one or more media files 114-1-c on the network storage server 150 in a way that is accessible by a user account previously established for a message sender or a message recipient. The message sender may comprise the first user of the computing device 110-1 that is generating the message 116. The message recipient may comprise the second user of the computing device 110-2 that is the intended recipient of the message 116.

The logic flow 300 may generate a link to the stored media file at block 306. For example, once the interactions between the message server 140 and the network storage server 150 are completed, the attachment manager 144 of the message server 140 may generate the one or more links 118-1-d. Additionally or alternatively, the attachment manager 144 may receive the one or more links 118-1-d from the network storage server 150.

The links 118-1-d may individually or collectively comprise a reference to the media file 114-1-c stored on the network storage server 150 in a manner that is discoverable by a message sender or a message recipient. As used herein, the term "discoverable" refers to a storage location that is known and accessible by a message sender and/or message recipient without using the links 118-1-d. For example, the attachment manager 144 of the message server 140 may store the media file on the network storage server 150 accessible by a user account previously established for the message sender or the message recipient. The user account may be accessible over a private or public network, such as the Internet via a web browser, for example. Examples of user accounts may include online storage or social networking services, including without limitation MICROSOFT LIVE, MYSPACE™, FACEBOOK™, LINKEDIN™ TWITTER™, BEBO™, and other online storage or social networking services consistent with the described embodiments. The embodiments are not limited in this context.

The logic flow 300 may send the link for the stored media file over the first transport at block 308. For example, the attachment manager 144 may send the one or more links 118-1-d for the stored media files 114-1-c over the first transport 112-1.

Figure 4:
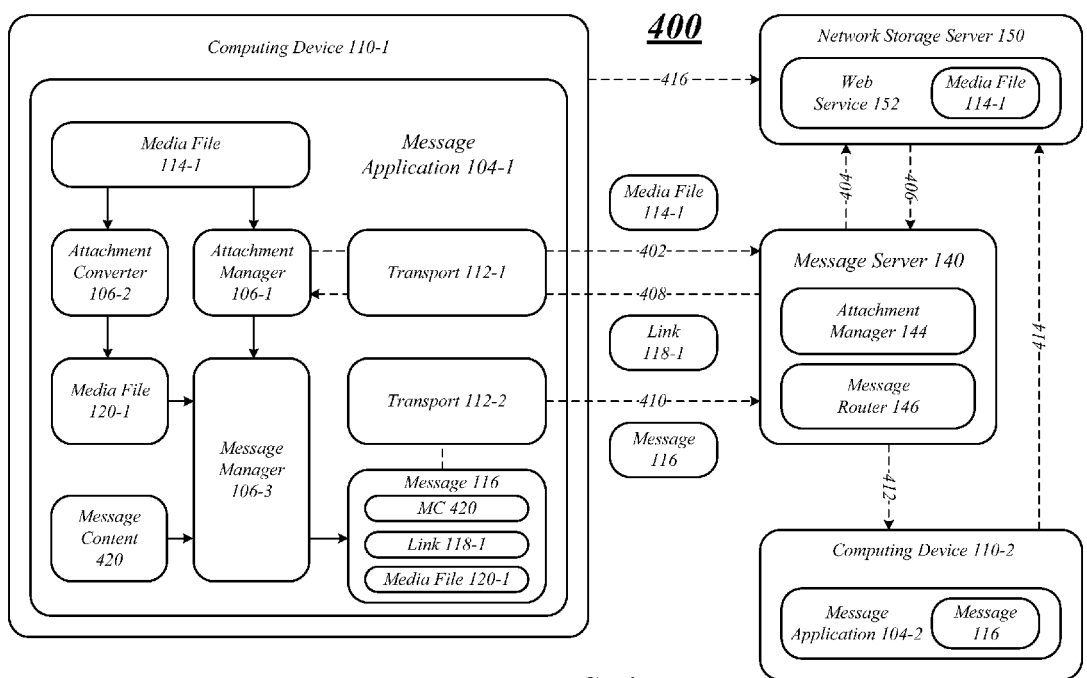
FIG. 4 illustrates an embodiment of a first operating environment.

FIG. 4 illustrates an embodiment of an operating environment 400 suitable for the messaging architecture 100. The operating environment 400 illustrates signaling between the various devices of the messaging architecture 100 to provide enhanced messaging services for the computing devices 110-1, 110-2.

In the illustrated embodiment shown in FIG. 4, assume a use scenario where a first user of the computing device 110-1 desires to communicate a message 116 with an attachment to a second user of the computing device 110-2. In generating a message 116, the attachment manager 106-1 of the message application 104-1 implemented by the computing device 110-1 may receive a request to attach a media file 114-1 to a message 116. The media file 114-1 may comprise a photograph stored in memory 103. The attachment manager 106-1 may implement a set of custom user interfaces and services with the user interface 108 to communicate the media file 114-1 from the computing device 110-1 to the message server 140 before the message 116 is communicated to the message server 140. Exemplary user interfaces generated by the user interface 108 may be described with reference to FIGS. 7, 8.

The attachment manager 106-1 may retrieve the media file 114-1 from the memory 103 and send the media file 114-1 to the message server 140 over the first transport 112-1 via the network 130 as indicated by arrow 402. The attachment manager 144 of the message server 140 may receive the media file 114-1 for the message 116, and initiate operations to store the media file 114-1 to a user account for the message sender of a web service 152 implemented by the network storage server 150. The attachment manager 144 of the message server 140 may send the media file 114-1 and/or appropriate security credentials for the message sender to the web service 152 as indicated by arrow 404. The web service 152 may use the security credentials to authenticate the message sender, and store the media file 114-1 as part of a user account for the message sender. It may be appreciated that by storing the media file 114-1 as part of a user account for the message sender, the media file 114-1 may be discoverable by the message sender and/or the message recipient, thereby allowing the message sender and/or the message recipient to access the media file 114-1 using access techniques other than the link 118-1. For instance, the message sender and/or the message recipient may use a conventional web browser to access the web service 152 via the Internet.

The web service 152 may return a link 118-1 to the media file 114-1 stored on the network storage server 150. The attachment manager 144 may receive the link 118-1 as indicated by arrow 406, and send it to the computing device 110-1 over the first transport 112-1 as indicated by arrow 408.

The attachment manager 106-1 may receive the link 118-1 for the media file 114-1 from the message server 140 over the first transport 112-1, and forward the received link 118-1 to the message manager 106-3.

Sometime while the attachment manager 106-1 is interoperating with the message server 140 to transport the media file 114-1 and receive the link 118-1, the message application 104-1 may receive a control directive via the user interface 108 to embed an alternate version of the media file 120-1 in the message 116. The attachment converter 106-2 of the message application 104-1 may receive the media file 114-1 and begin operations to modify one or more attributes of the media file 114-1 to form an alternate version of the media file 120-1. For instance, the attachment converter 106-2 may modify size and resolution attributes for the media file 114-1 to form the media file 120-1 having a smaller size and lower resolution than the media file 114-1 as originally stored in the memory 103. The attachment converter 106-2 may forward the media file 120-1 (or a reference) to the message manager 106-3.

The message manager 106-3 may receive as inputs the link 118-1 and the media file 120-1. The message manager 106-3 may also receive as input message content 420 generated by the message sender via the user interface 108. The message manager 106-3 may then embed the message content 420, the link 118-1 and/or the media file 120-1 in the message 116. Once formed and ready for transport, the message application 104-1 may send the message 116 to one or more message recipients over the second transport 112-2 as indicated by arrow 410. The message recipient may comprise, for example, the second user of the computing device 110-2.

The message router 146 of the message server 140 may receive the message 116, and route the message 116 to the message application 104-2 of the computing device 110-2 as indicated by arrow 412. The second user of the computing device 110-2 may open the message 116 and view the message content 420, the link 118-1 and/or the media file 120. The first or second user may then access the media file 114-1 stored by the web service 152 as indicated by arrows 414, 416.

By way of example, the second user of the computing device 110-2 may access the media file 114-1 stored by the web service 152 using the link 118-1. Additionally or alternatively, the second user of the computing device 110-2 may access the media file 114-1 stored by the web service 152 using a web browser and a network address for the web service 152 (e.g., a uniform resource locator). For instance, the second user may access the web service 152, present security credentials for a user account of the message recipient, and access a user account for the message sender previously connected to the user account of the message recipient (e.g., a friend or buddy account). In another example, the second user may access the web service 152 to access a public account for the message sender and/or the message recipient. Other access techniques may be used consistent with the described embodiments.

Figure 5:
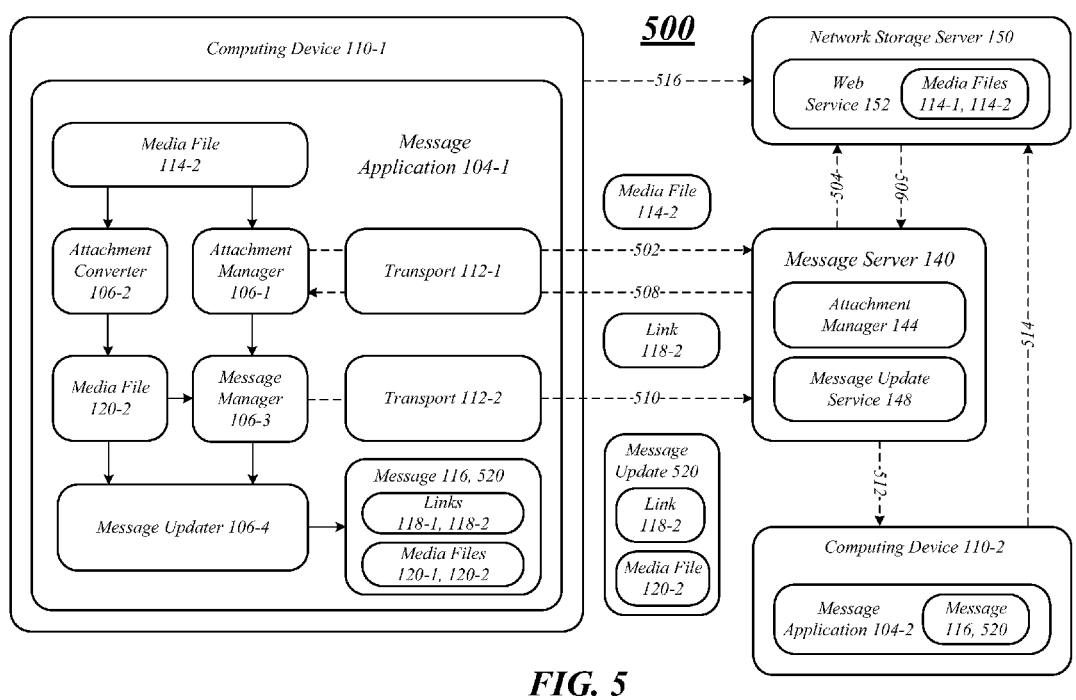
FIG. 5 illustrates an embodiment of a second operating environment.

FIG. 5 illustrates an embodiment of an operating environment 500 suitable for the messaging architecture 100. The operating environment 500 illustrates signaling between the various devices of the messaging architecture 100 to provide enhanced message update services for the computing devices 110-1, 110-2. More particularly, the operating environment 500 illustrates a use scenario where a message update originates from a message sender using the message application 104-1 of the computing device 110-1.

In addition to providing a more efficient mechanism for transporting attachments for a message, the message applications 104-1-b may implement various techniques to dynamically update messages after they have been communicated and stored by the message applications 104-1-b. For example, once the message application 104-1 sends the message 116, the message application 104-1 typically stores a copy of the sent message 116 in a "Sent" folder. Similarly, once the message application 104-2 receives the message 116, the message application 104-2 typically stores a copy of the received message 116 in an "Inbox" folder. The message applications 104-1, 104-2 may each implement a message updater 106-4 that allows updates to the stored versions of the message 116. The message updates may originate, for example, from the message sender, the message recipient and/or a third party.

In the illustrated embodiment shown in FIG. 5, assume the message sender desires to update the message 116 with a second media file 114-2, such as another picture for a photo album. The message application 104-1 may perform operations indicated by arrows 502, 504, 506 and 508 similar to those described with reference to corresponding arrows 402, 404, 406 and 408. As a result, the media file 114-2 is added to the media file 114-1 stored by the web service 152. Further, the message application 104-1 receives a link 118-2 for the media file 114-2 from the message server 140.

The message updater 106-4 receives as input the link 118-2, the media file 120-2 and/or any additional message content from the message sender. The media file 120-2 is created via the attachment converter 106-2 using operations similar to those given for the media file 120-1. The message update 106-4 then updates the stored message 116 with the link 118-2, the media file 120-2 and/or any additional message content from the message sender.

The message updater 106-4 generates a message update 520 with the link 118-2, the media file 120-2 and/or any additional message content from the message sender. The message application 104-1 sends the message update 520 for the message 116 stored by the message application 104-2 after the message 116 has been sent by the message sender via the second transport 112-2, with the message update 520 having information from the message sender, such as the link 118-2, the media file 120-2 and/or any additional message content from the message sender.

The message update service 148 of the message server 140 receives the message update 520 from the message application 104-1, and sends the message update 520 to the computing device 110-2. The message updater 106-4 of the message application 104-2 receives the message update 520, and updates its stored version of the message 116 with the information from the message update 520.

Additionally or alternatively, instead of generating a separate message update 520, the message application 104-1 may update the message 116 with information described with reference to the message update 520, and send the entire updated message to the message server 140. The message update service 148 of the message server 140 receives the updated message 116 from the message application 104-1, and sends the updated message 116 to the computing device 110-2. The message updater 106-4 of the message application 104-2 receives the updated message 116, and replaces its stored version of the message 116 with the updated message 116.

Figure 6:
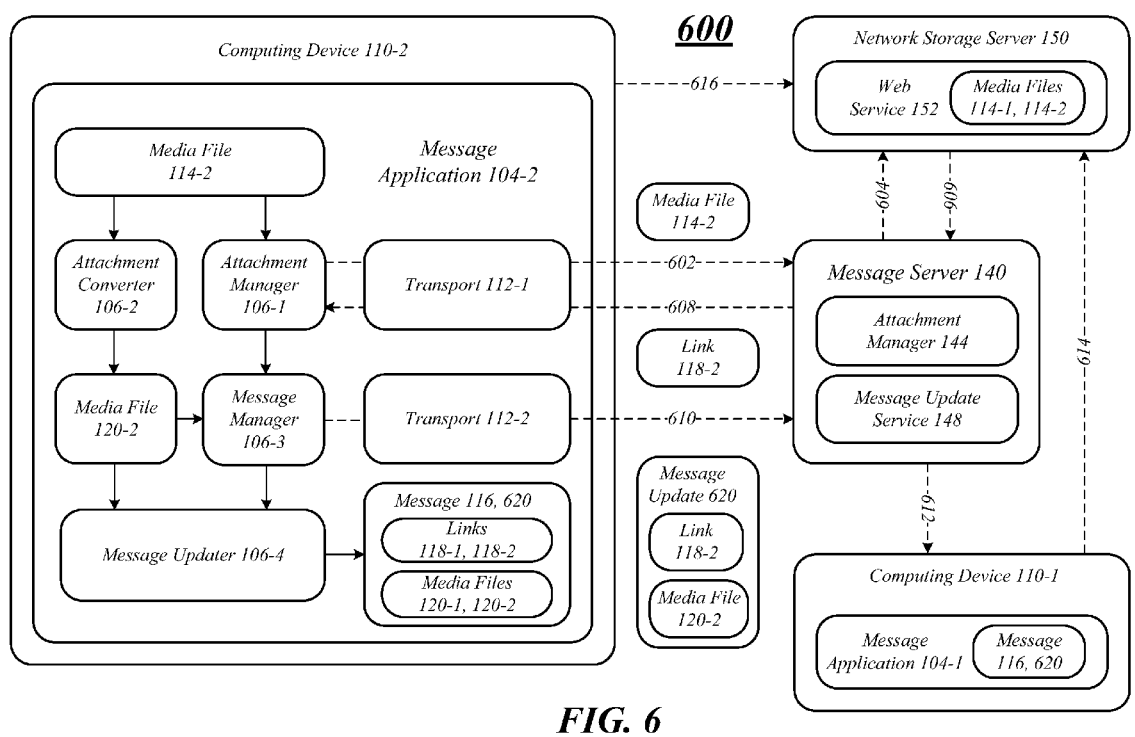
FIG. 6 illustrates an embodiment of a third operating environment.

FIG. 6 illustrates an embodiment of an operating environment 600 suitable for the messaging architecture 100. The operating environment 600 illustrates signaling between the various devices of the messaging architecture 100 to provide enhanced message update services for the computing devices 110-1, 110-2. More particularly, the operating environment 600 illustrates a use scenario where a message update originates from a message recipient using the message application 104-2 of the computing device 110-2.

As previously described, in some embodiments, the message application 104-2 and the computing device 110-2 implement enhanced messaging services and media file sharing techniques to communicate and share messages and message attachments using the same or similar hardware and/or software components as those described with reference to the message application 104-1 and the computing device 110-1. In this case, the message recipient may originate a message update to a stored version of the message 116 using operations that are the same or similar to those described with reference to the operating environment 500 shown in FIG. 5. For instance, the operations described with reference to arrows 602, 604, 606, 608, 610, 612, 614 and 616 of the operating environment 600 may be the same or similar to the operations described with reference to corresponding arrows 502, 504, 506, 508, 510, 512, 514 and 516 of the operating environment 500.

The operating environments 500, 600 are used to describe dynamic message updates from respective computing devices 110-1, 110-2 (e.g., the message sender and message recipients). In addition, message updates may be received from a third party, such as the web service 152 implemented by the network storage server 150. For instance, when the web service 152 is implemented as a social network, the stored media files 114-1-c may receive various additional types of information related to the stored media files 114-1-c. Examples may include additional information from other users of the social network, such as additional photos, comments, metadata, and so forth. When this occurs, the web service 152 may forward the additional information to the message server 140, and the message update service 148 implemented by the message server 140 may dynamically update stored versions of the message 116 stored by the message applications 104-1, 104-2 of the respective computing devices 110-1, 110-2. Additionally or alternatively, the web service 152 may forward the additional information directly to the computing devices 110-1, 110-2 for handling by the respective message updaters 106-4. The embodiments are not limited in this context.

Figure 7:
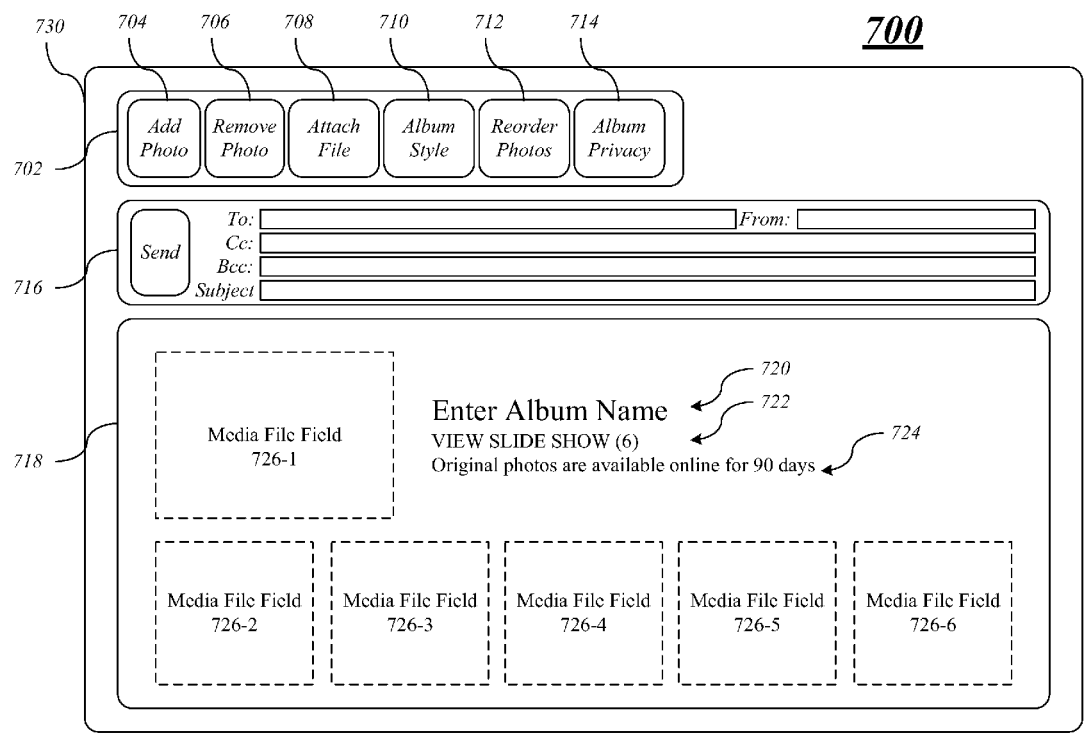
FIG. 7 illustrates an embodiment of a first user interface view.

FIG. 7 illustrates an embodiment of a user interface view 700. The user interface view 700 may be an exemplary user interface view provided by the user interface 108 for message applications 104-1, 104-2 implemented as an email message application. More particularly, the user interface view 700 illustrates an example of creating a new email message suitable for attachments in the form of media files 114-1-c.

In the illustrated embodiment shown by the user interface view 700, the user interface 108 may provide a user interface for generating an email message 730 on behalf of the message application 104-1. The email message 730 may comprise various display objects, including a ribbon bar 702, an address body 716 and a message body 718. The ribbon bar 702 may have display objects representing various message commands. The address bar 716 may have display objects for receiving addressing information. The message body 718 may comprise a surface to accept multimedia content, including message content 420 (e.g., text information) and media files 120-1-g.

The ribbon bar 702 may include an "Add Photo" display object 704. When a user activates the "Add Photo" display object 704, the user interface 108 generates a control directive to add a media file 120-1-g (e.g., a photo) to the email message 730 in one of the media file fields 726-1-h shown in the message body 718.

The ribbon bar 702 may include a "Remove Photo" display object 706. When a user activates the "Remove Photo" display object 706, the user interface 108 generates a control directive to remove a media file 120-1-g (e.g., a photo) from the email message 730 from one of the media file fields 726-1-h shown in the message body 718.

The ribbon bar 702 may include an "Attach File" display object 708. When a user activates the "Attach File" display object 708, the user interface 108 generates a control directive to add a file as a regular attachment to the email message 730.

The ribbon bar 702 may include an "Album Style" display object 710. When a user activates the "Album Style" display object 710, the user interface 108 displays a new set of display objects providing various style, format and/or layout options and/or templates for embedding the media files 120-1-g into the message body 718. When activated, the message application 104-1 receives a control directive representing a style parameter for embedding the media file 114-1-c in the email message 730.

The ribbon bar 702 may include a "Reorder Photos" display object 712. When a user activates the "Reorder Photos" display object 712, the user interface 108 generates a control directive to order or reorder any photos embedded into the message body 718 of the email message 730. When activated, the message application 104-1 receives a control directive representing an order parameter for ordering multiple media files 114-1-c in the email message 730. For instance, the photos may be shuffled, grouped, ordered by size, positioned based on available screen size, positioned based on other user interface elements embedded into the message body 718, and any other ordering parameters consistent with the embodiments.

The ribbon bar 702 may include an "Album Privacy" display object 714. When a user activates the "Album privacy" display object 714, the user interface 108 generates a control directive representing a privacy setting for the media files 114-1-c stored on the network storage server 150. When activated, the message application 104-1 receives a control directive representing a privacy parameter for accessing the media files 114-1-c on the network storage server 150. For instance, the privacy parameter may be set to allow only the message recipients to view the stored media files 114-1-c. In another example, the privacy parameter may be set to allow public viewing essentially allowing anyone to view the stored media files 114-1-c. In this case, the user interface view 700 may offer an option to remove any metadata associated with the media files 114-1-c (e.g., identifying information, description, etc.).

Additionally or alternatively, the privacy parameter may have an associated time parameter representing an amount of time the media files 114-1-c may be accessed (e.g., 90 days) as measured from the time the email message 730 was sent (or when the media files 114-1-c were stored).

In addition to having a surface to accept multimedia content, including message content 420 (e.g., text information) and media files 120-1-g, the message body 718 may also have a display object 720 for accepting a name for a collection of media files 114-1-c, such as a photo album name. The message body 718 may further include a display object 722 representing an embedded link to the stored media files 114-1-c (e.g., one or more links 118-1-d). The message body 718 may still further include a display object 724 indicating the time parameter (e.g., 90 days).

Figure 8:
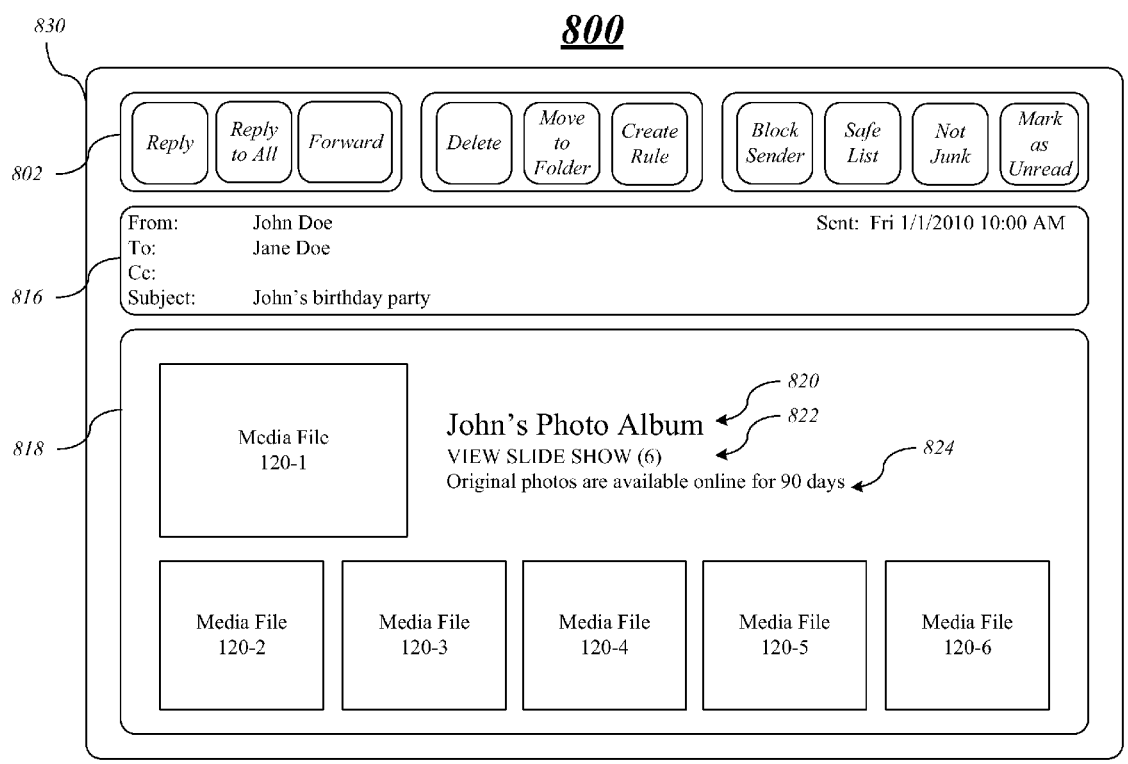
FIG. 8 illustrates an embodiment of a second user interface view.

FIG. 8 illustrates an embodiment of a user interface view 800. The user interface view 800 may be an exemplary user interface view provided by the user interface 108 for message applications 104-1, 140-2 implemented as an email message application.

The user interface view 800 illustrates a received email message 830. The received email message 830 may be an example of a received version of the email message 730 communicated by the message application 104-1. As shown, the received email message 830 may comprise a ribbon bar 802 with various command elements, an address bar 816 with addressing information, and a message body 818.

The message body 818 may include media files 120-1 to 120-6, which are alternative versions of the respective media files 114-1 to 114-6. The message body 818 may further comprise a display object 820 with an album name, a display object 822 with an embedded link 118-1-c, and a display object 824 with a time parameter indicating how long the message recipient "Jane Doe" can access "John's Photo Album" stored by the web service 152 of the network storage server 150.

It is worthy to note that although various embodiments are described with logic for enhanced messaging services and media file sharing techniques to communicate and share messages and message attachments using different message applications as implemented in the computing devices 110-1-a, it may be appreciated that some or all of the hardware and/or software components needed to implement such techniques may be implemented by the message server 140. For instance, the media files 114-1-c may be attached to a message using conventional techniques, and the message server 140 may be arranged to store and replace the attached media files 114-1-c with the link 118-1-d and the alternate media files 120-1-g prior to forwarding to the message recipients. Similarly, dynamic updates from the computing devices 110-1-a and any third parties may be handled by logic implemented by the message server 140. The embodiments are not limited in this context.

Figure 9:
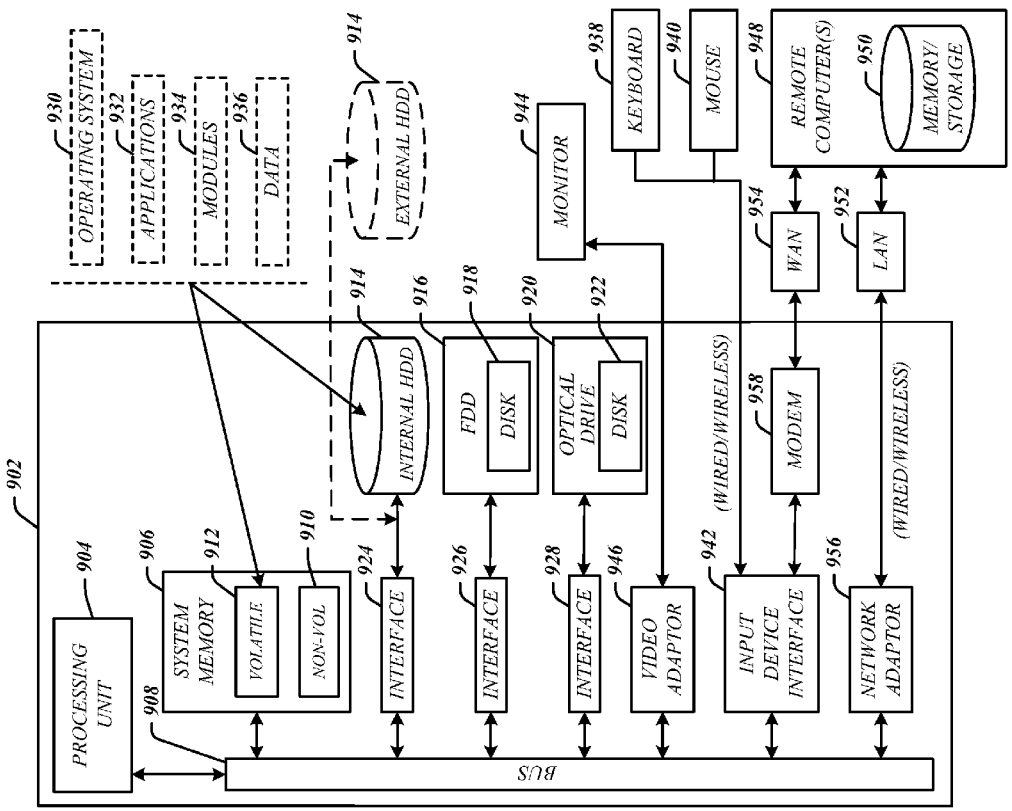
FIG. 9 illustrates an embodiment of a computing architecture.

FIG. 9 illustrates an embodiment of an exemplary computing architecture 900 suitable for implementing various embodiments as previously described. The computing architecture 900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The system memory 906 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. The one or more application programs 932, other program modules 934, and program data 936 can include, for example, the message applications 104-1-b for the computing devices 110-1-a. When the computing architecture is implemented for the message server 140, the one or more application programs 932, other program modules 934, and program data 936 can include, for example, the message application 104-1-attachment manager 144, the message router 146 and/or the message update service 148.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.9x (a, b, g, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
receiving a request to attach a media file to a message at a message application on a sender computing device;
sending the media file from the message application to a message server over a first transport before the message is communicated to the message server;
receiving a link for the media file from the message server by the sender computing device over the first transport, the link comprising a reference to a discoverable storage location on a network storage server for the media file, the discoverable storage location corresponding to a user account for the sender for a web service implemented by the network storage server;
embedding the link in the message; and
sending the message with the embedded link to a message recipient over a second transport.

2. The computer-implemented method of claim 1, the link comprising a reference to a discoverable storage location for the media file as stored on the network storage server, the discoverable storage location accessible by a message sender or a message recipient without the link.

3. The computer-implemented method of claim 1, comprising receiving a control directive to embed an alternate version of the media file in the message.

4. The computer-implemented method of claim 1, comprising modifying one or more attributes of the media file to form an alternate version of the media file.

5. The computer-implemented method of claim 1, comprising embedding an alternate version of the media file in the message.

6. The computer-implemented method of claim 1, comprising receiving a control directive representing a style parameter for embedding the media file in the message.

7. The computer-implemented method of claim 1, comprising receiving a control directive representing a privacy parameter for accessing the media file on a network storage service.

8. The computer-implemented method of claim 1, comprising receiving a control directive representing an order parameter for ordering multiple media files in the message.

9. The computer-implemented method of claim 1, comprising updating the message with a message update having information from the message recipient after the message has been sent by a message sender.

10. The computer-implemented method of claim 1, comprising
sending a message update for the message after the message has been sent by a message sender, the message update having information from the message sender.

11. An article comprising a computer-readable storage device containing instructions that when executed cause a system to:
receive a media file for a message by a message service over a first transport at a message server, from a message application executing on a sender computing device, before the message is received from the message application executing on the sender computing device;
store the received media file by the message service on a network storage server accessible by a user account previously established for a message sender or a message recipient;
generate a link to the stored media file; and
send the link for the stored media file over the first transport to the sender computing device.

12. The article of claim 11, further comprising instructions that if executed enable the system to store the media file on a server accessible by the user account previously established for the message sender or the message recipient without the link.

13. The article of claim 11, further comprising instructions that if executed enable the system to receive the message having the link embedded within the message by the message service over a second transport, and send the message with the embedded link to a message recipient over the second transport.

14. The article of claim 11, further comprising instructions that if executed enable the system to receive a message update with information for the message from the network storage service after the message has been sent, and send the message update to a message sender or a message recipient.

15. An apparatus, comprising:
a processor; and
a memory communicatively coupled to the processor, the memory to store a message application that when executed by the processor is operative to:
communicate a message and a message attachment comprising a media file at different time intervals using different transports to a message server, the message having a link comprising a reference to the media file stored by the message server at a discoverable storage location on a network storage server, the discoverable storage location corresponding to a user account for the sender for a web service implemented by the network storage server, wherein the message application comprises an attachment manager operative to receive a request to attach the media file to the message, send the media file to the message server over a transport before the message is communicated to the message server, receive the link for the media file from the message server over the transport, and embed the link in the message.

16. The apparatus of claim 15, the message application comprising an attachment converter operative to modify one or more attributes of the media file to form an alternate version of the media file.

17. The apparatus of claim 15, the message application comprising a message manager operative to communicate the message with the link over a transport, the link comprising a reference to a discoverable storage location for the media file as stored on a network storage server, the discoverable storage location accessible by a message sender or a message recipient without the link.

18. The apparatus of claim 15, the message application comprising a message updater operative to dynamically update the message with message updates having information for the message received after the message has been sent.

19. The apparatus of claim 15, the message application comprising a message updater operative to send message updates having information for the message after the message has been sent to a message recipient.

* * * * *